(12) United States Patent
Huang

(10) Patent No.: US 7,893,821 B2
(45) Date of Patent: Feb. 22, 2011

(54) TIRE PRESSURE MONITORING SYSTEM

(75) Inventor: Shiao-Hwa Huang, Taichung (TW)

(73) Assignee: Mobiletron Electronics Co., Ltd., Taichung Hsien (TW)

(*) Notice: Subject to any disclaimer, the term of this patent is extended or adjusted under 35 U.S.C. 154(b) by 289 days.

(21) Appl. No.: 12/332,167

(22) Filed: Dec. 10, 2008

(65) Prior Publication Data
US 2009/0207010 A1 Aug. 20, 2009

(30) Foreign Application Priority Data
Feb. 14, 2008 (TW) .............................. 97105235 A

(51) Int. Cl.
*B60C 23/00* (2006.01)
(52) U.S. Cl. ........................ 340/447; 340/442; 340/445; 73/146.4; 73/146.5
(58) Field of Classification Search ................. 340/447, 340/442, 443, 444, 445, 446, 448, 449, 431, 340/539.1; 73/146, 146.4, 146.5
See application file for complete search history.

(56) References Cited

U.S. PATENT DOCUMENTS

| | | | | | |
|---|---|---|---|---|---|
| 5,587,698 | A | * | 12/1996 | Genna | .......................... 340/442 |
| 7,075,419 | B2 | * | 7/2006 | Watabe | ........................ 340/447 |
| 7,336,159 | B2 | * | 2/2008 | Fackrell et al. | .............. 340/431 |

* cited by examiner

*Primary Examiner*—Davetta W Goins
(74) *Attorney, Agent, or Firm*—Browdy and Neimark, PLLC

(57) ABSTRACT

A tire pressure monitoring system includes receiving antennas installed in a vehicle corresponding to vehicle wheels, a monitoring main unit disposed near a driver's seat, tire pressure sensors respectively installed in the wheels of the vehicle to wirelessly transmit detected data in the form of a data packet for being received by one corresponding adjacent antenna, and a signal combining circuit formed of multiple combiners and having multiple input terminals electrically connected to the receiving antennas and an output terminal electrically connected to the monitoring main unit for combining data packets received from the receiving antennas and transmitting the combined data signal to the monitoring main unit by means of a wired transmission path.

7 Claims, 5 Drawing Sheets

TIRE PRESSURE MONITORING SYSTEM

BACKGROUND OF THE INVENTION

1. Field of the Invention

The present invention relates generally to tire pressure monitoring systems and more particularly, to such a tire pressure monitoring system, which utilizes a wireless transmission technique and a wired transmission technique to transmit detected data to a monitoring unit.

2. Description of the Related Art

A wireless tire pressure monitoring system outputs measured tire pressure data from each vehicle wheel in the form of a packet by means of a radio frequency. The packet envelops measured pressure data of every vehicle wheel and the corresponding identification code. When a receiving antenna in the chassis or the inside of the vehicle received the RF signal of the packet, the package is read through RF circuit processing for enabling the monitoring main unit in the driver's cab to display the tire pressure of every vehicle wheel. More particularly, the use of a wireless tire pressure monitoring system in a towing vehicle or the like where the wheels operate under a high load condition can effectively monitor the tire pressure status of every wheel, thereby maintaining the service life of the wheels and assuring driving safety. However, following population of wireless communication applications, the overlap condition of RF bandwidth is frequently seen. Digital transmission utilizes a specific packet verification technique to discriminate wireless communication signals. However, processing of external RF signals within the same bandwidth relatively increases the bit error rate and the chance of packet collision.

FIG. 5 illustrates the arrangement of a wireless tire pressure monitoring system 1 in a towing vehicle 2 according to the prior art. As illustrated, the monitoring main unit 10 in the driver's cab at the truck-tractor 21 is electrically connected to a receiving antenna 12 at the bottom side of the chassis of the towing vehicle 2 through a transmission line 11, and a tire pressure sensor 13 is installed in each wheel 23 of the truck-tractor 21 and each wheel 24 of the platform (or trailer) 22. Each tire pressure sensor 13 sends the measured data in the form of a packet to the receiving antenna 12 by means of a radio frequency. According to this design, the receiving antenna 12 receives the RF signals from all the tire pressure sensors 13. By means of the use of a high-power transmitting antenna, the tire pressure sensor 13 that is disposed far away from the receiving antenna 12 can effectively send the signal to the area within the effective receiving range of the receiving antenna 12. For the sake of one single specification for convenient use, all the tire pressure sensors 13 must use a same high-power transmitting antenna. Further, when the receiving antenna 12 with long-distance receiving capacity is used, the chance of simultaneously receiving external RF signals will relatively increase. In case a nearby vehicle is provided with wireless tire pressure sensors of similar bandwidth, the RF signals from the nearby vehicle will be received by the receiving antenna 12 of the wireless tire pressure monitoring system 1 and the monitoring main unit 10 will process these external signals, increasing the chance of error reading and packet collision. To solve this problem, an application of a complicated high-level software processing data packet can be used in the tire pressure sensors 13 and the monitoring main unit 10 to increase the ability of packet verification so as to further lower the chance of error reading; however, if this solution is adopted, the accompanying amplification of noises may interfere with effective radio signals, raising the bit error rate.

SUMMARY OF THE INVENTION

The present invention has been accomplished under the circumstances in view. It is the main object of the present invention to provide a tire pressure monitoring system, which has a low power circuit characteristic to avoid interference of ambient wideband signals, thereby effectively lowering the bit error rate in packet transmission and the misjudgment of the system.

To achieve this object of the present invention, the tire pressure monitoring system is adapted to be installed in a vehicle for detecting tire pressures of vehicle wheels through tire pressure sensors respectively installed in the vehicle wheels and capable of wirelessly transmitting detected tire pressure data in the form of a data packet. The tire pressure monitoring system comprises a monitoring main unit adapted to be disposed near a driver's seat of the vehicle for enabling a driver of the vehicle to monitor the operation status of each vehicle wheel, a plurality of receiving antennas adapted to be installed in the vehicle, and a plurality of combiners. Each receiving antenna is adapted for receiving wireless communication signal transmitted from at least one tire pressure sensor nearby. The combiners form a signal combining circuit having at least two input terminals respectively electrically connected with the receiving antennas and an output terminal electrically connected to the monitoring main unit. The output terminal of a first combiner is electrically connected to the input terminal of a second combiner and the output terminal of the second combiner is electrically connected to the aforesaid main monitoring unit, such that the wireless communication signals received by the receiving antennas are transmitted through at least one second combiner to the monitoring main unit through a wired transmission path.

BRIEF DESCRIPTION OF THE DRAWING

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
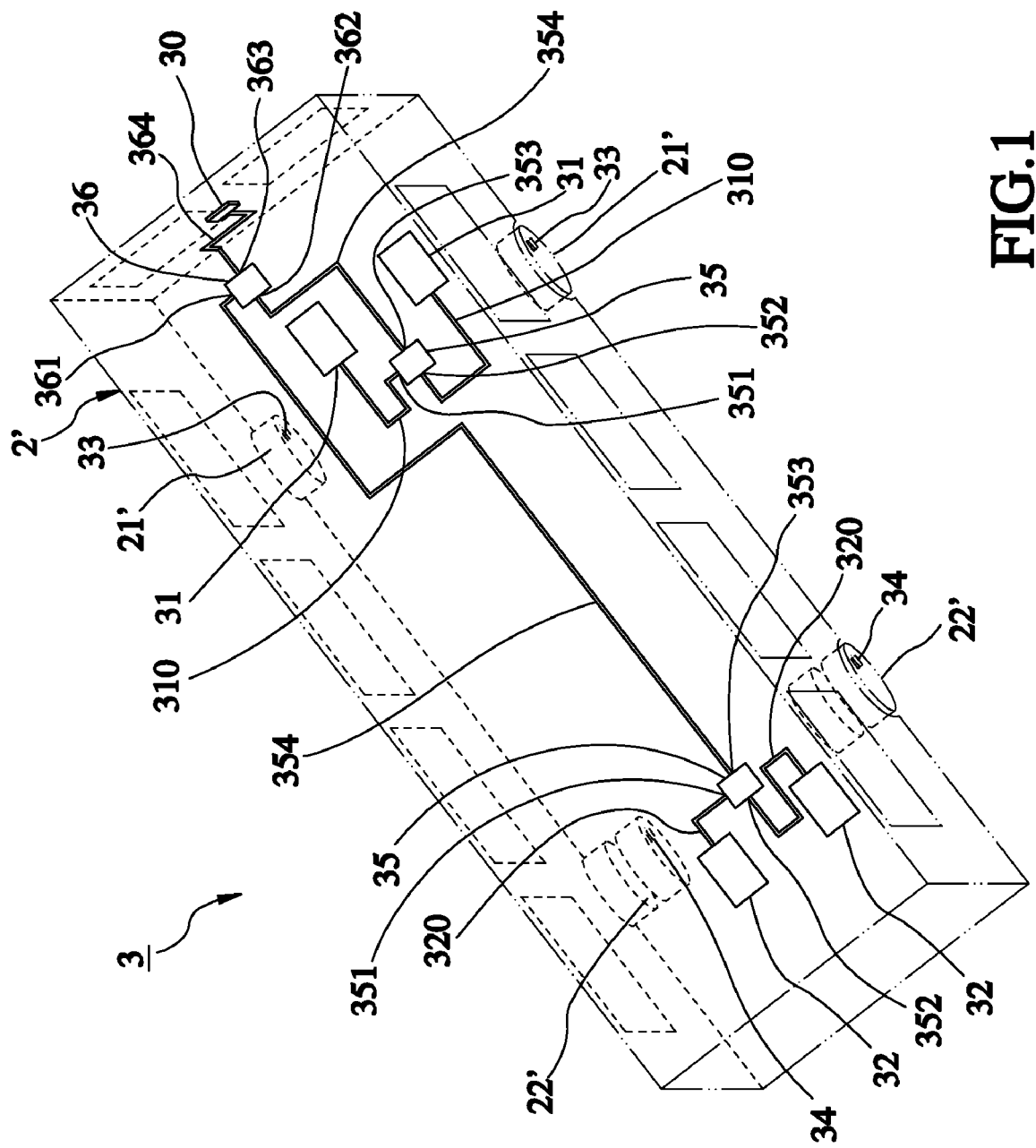
FIG. 1 is a schematic drawing showing the arrangement of a tire pressure monitoring system in a vehicle in accordance with a first embodiment of the present invention.

Referring to FIG. 1, a tire pressure monitoring system 3 is shown installed in a large vehicle 2', comprising a monitoring main unit 30, two front receiving antennas 31 set at the head portion of the vehicle 2', two rear receiving antennas 32 set at the tail portion of the vehicle 2', a plurality of tire pressure sensors 33 and 34, two first combiners 35, and one second combiner 36.

The monitoring main unit 30 is installed in the front side of the driver's cab of the vehicle 2', having simple and effective radio frequency circuit means for processing low-power RF signal, data processing software means for processing the digital data packet carried in RF signal, and display means for displaying the data message carried in the data packet for allowing the driver to monitor the conditions of the vehicle 2'.

The receiving antennas 31 and 32 are installed in the bottom side of the vehicle near the wheels to receive wireless RF signal within the respective effective range and to transmit received RF signal through respective transmission lines 310, 320 to the combiners 35 and 36 for processing. And for effectively receiving the wireless RF signal, the distance between the receiving antenna 31, 32 and the respectively nearest tire pressure sensor 33, 34 is shorter than the distance between the two receiving antennas 31 and 32.

The tire pressure sensors 33, 34 are respectively installed in the front and rear wheels 21', 22' to detect the tire pressure of the wheels 21', 22' and other related status and to process the detected tire pressure data and the related ID code into a data packet and then to send out a wireless communication signal carrying the data packet wirelessly by means of a respective low-power RF transmitting antenna thereof for receiving by the ambient receiving antennas 31, 32.

The combiners 35 and 36 are signal combining devices, each having two input terminals and one output terminal. The combiners 35, 36 receive RF signals from different locations through the respective input terminals 351, 352, 361 and 362 and combine both the phase and power of the respectively received signals for transmitting through one single RF transmission line via the respective output terminals 353, 363. The input terminals 351, 352 of the first combiners 35 are respectively electrically connected to the receiving antennas 31, 32 through the respective transmission lines 310, 320. The output terminals 353 of the first combiners 35 are respectively electrically connected to the two input terminals 361, 362 of the second combiner 36 via transmission lines 354. The output terminal 363 of the second combiner 36 is electrically connected to the monitoring main unit 30 through one transmission line 364.

Because the receiving antennas 31, 32 are installed in the bottom side of the vehicle near the wheels 21', 22', the data packets sent by the tire pressure sensors 33, 34 by means of a respective low-power RF transmitting antenna can be effectively received by the ambient receiving antennas 31, 32, and then be sent to the first combiners 35 by a wired transmission path; thereafter, the first combiners 35 can combine the respective signals and transmit the respective combined signals to the second combiner 36. At final, the second combiner 36 combines all the signals produced by the tire pressure sensors 33, 34 and transmits the finally combined signal to the monitoring main unit 30 by means of a wired transmission path. Because the RF transmitting antennas of the tire pressure sensors 33, 34 consume low power, the invention effectively save power consumption. Further, the receiving antennas 31, 32 receive RF signals from the corresponding tire pressure sensors 33, 34 within a short distance, the operation of the present invention avoids interference of ambient wideband signals, effectively lowering data packet transmission bit error rate.

Figure 2:
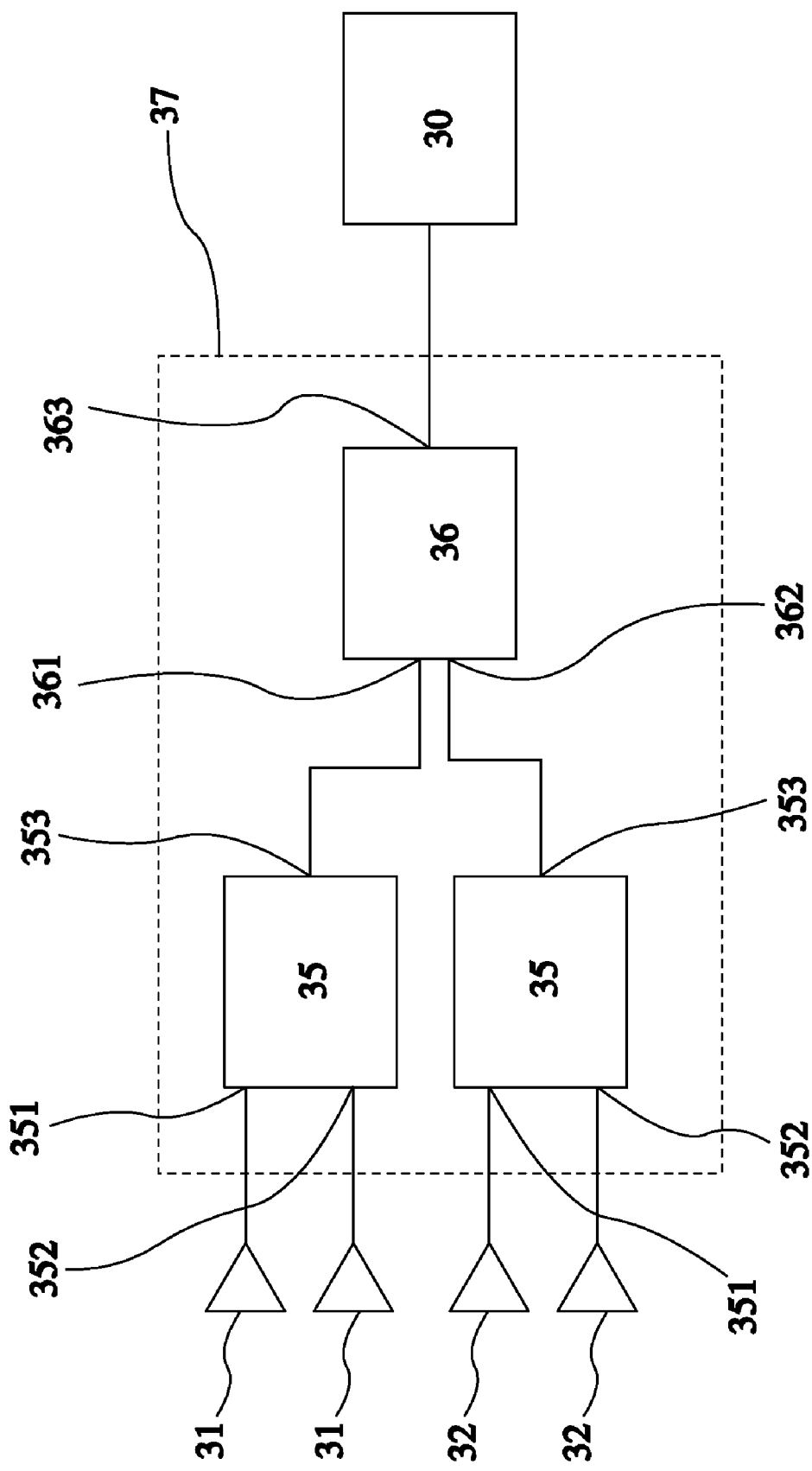
FIG. 2 is a circuit block diagram of an equivalent circuit of the wired transmission part of the tire pressure monitoring system in accordance with the first embodiment of the present invention.

Further, by means of utilizing the combiners 35, 36, the receiving antennas 31, 32 of the tire pressure monitoring system 3 can be installed in any of a variety of big-scale vehicle systems and disposed near the corresponding wheels of the vehicle to receive RF data packet signals from the tire pressure sensors 33, 34 and to transmit received data packets to the combiners 35, 36 by means of a wired transmission technique. However, the number and location of the combiners 35, 36 according to the present invention are not limited to the aforesaid arrangement. FIG. 2 illustrates an equivalent circuit block diagram of the tire pressure monitoring system according to the present invention. As illustrated, the first combiners 35 that are respectively, electrically and directly connected to the receiving antennas 31, 32 are served as anterior signal combiners, and the second combiner 36 that is electrically connected to the monitoring main unit 30 is served as a posterior signal combiner, such that the wired transmission portions of the whole communication system integrally form a signal combining circuit 37 having four input terminals and one output terminal. For use in a big-scale vehicle having a relatively greater number of wheels, or for the sake of effective signal receiving at a relatively lower power, a relatively greater number of receiving antennas can be installed corresponding to the vehicle wheels and electrically connected to the two-input and one-output first combiners and one or more two-input and one-output combiners can be interposed and electrically connected between the first combiners and the second combiner for signal transmission.

Figure 3:
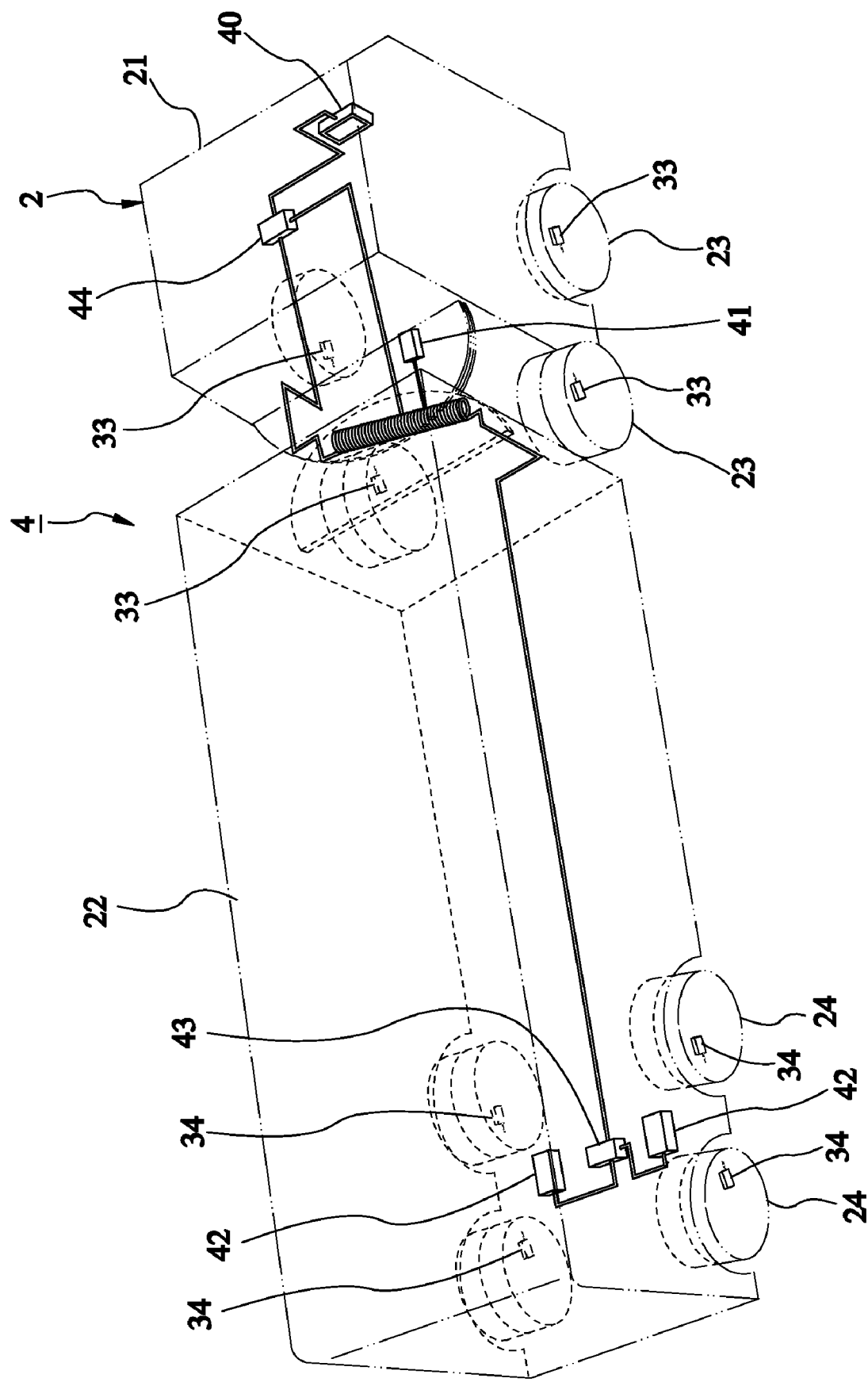
FIG. 3 is a schematic drawing showing the arrangement of a tire pressure monitoring system in a towing vehicle in accordance with a second embodiment of the present invention.
Figure 4:
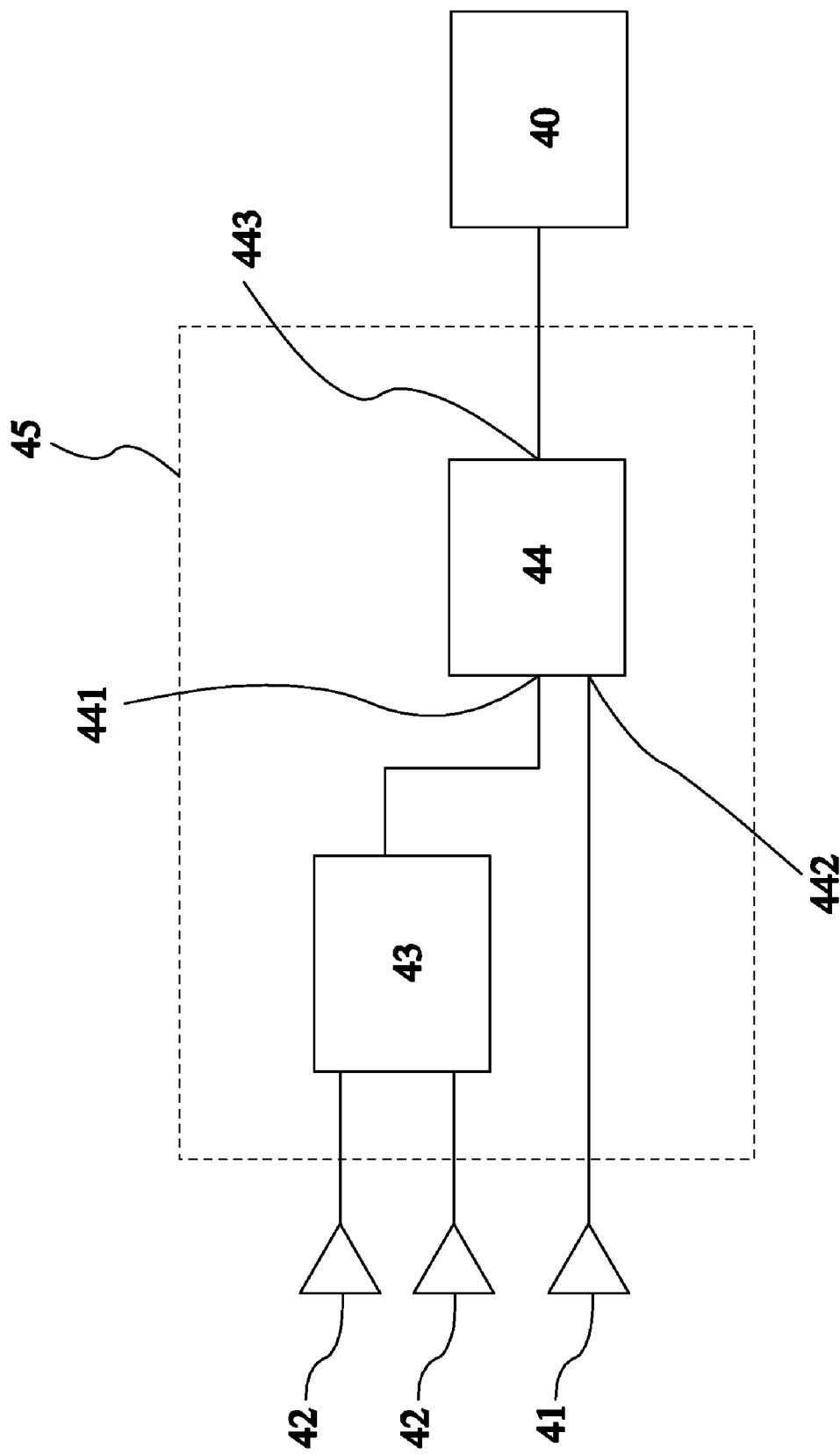
FIG. 4 is a circuit block diagram of an equivalent circuit of the wired transmission part of the tire pressure monitoring system in accordance with the second embodiment of the present invention.
Figure 5:
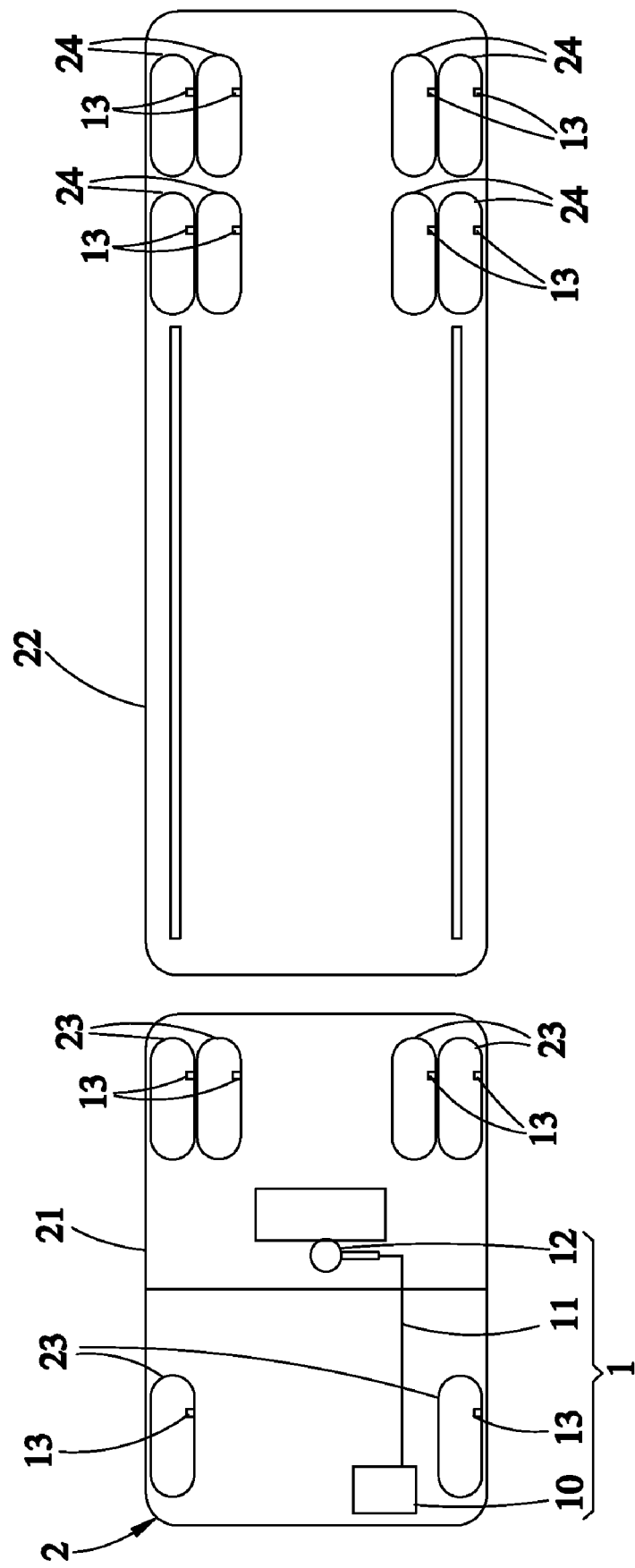
FIG. 5 is a schematic drawing showing the arrangement of a wireless tire pressure monitoring system in a towing vehicle according to the prior art.

FIGS. 3 and 4 illustrate a tire pressure monitoring system 4 installed in a towing vehicle 2 in accordance with a second embodiment of the present invention. The tire pressure monitoring system 4 comprises a monitoring main unit 40 installed in the driver's cab of the truck-tractor 21 of the towing vehicle 2, a front receiving antenna 41 installed in the truck-tractor 21, two rear receiving antennas 42 installed in the trailer 22 of the towing vehicle 2, a first combiner 43 installed in the trailer 22 and electrically connected with the receiving antennas 42, a second combiner 44 installed in the truck-tractor 21 and electrically connected to the monitoring main unit 40, and a plurality of tire pressure sensors 33, 34 respectively installed in the wheels 23, 24 of the towing vehicle 2. The differences between this second embodiment and the aforesaid first embodiment are outlined hereinafter.

Because the wheels 23 are closely arranged at the bottom side of the truck-tractor 21 of the towing vehicle 2, the tire pressure sensors 33 can commonly communicate with the single receiving antenna 41 at a lower power manner. FIG. 4 illustrates an equivalent circuit block diagram of the tire pressure monitoring system according to the second embodiment of the present invention. As illustrated, the output terminal of the first combiner 43 and the receiving antenna 41 are respectively electrically connected to the two input terminals 441, 442 of the second combiner 44, and the output terminal 443 of the second combiner 44 is electrically connected to the monitoring main unit 40 for enabling the monitoring main unit 40 to process wireless communication signals received from the receiving antenna 41, 42.

The second combiner 44 provides a posterior signal combining function when compared to the first combiner 43; however, the phase and power regulation circuit function of the second combiner 44 allows the second combiner 44 to combine the signal from the first combiner 43 and the signal from the receiving antenna 41. Therefore, the wired transmission portions of the whole communication system integrally constitute a three-input and one-output signal combining circuit 45. Unlike the aforesaid first embodiment, the input terminals of the second combiner of this second embodiment are not all connected to the first combiner. Further, for application under a relatively lower power environment, the number of the receiving antenna and the first combiner may be increased, and additional combiner means may be interposed between the anterior combiner and the posterior combiner. Further, same as the aforesaid first embodiment, the tire pressure monitoring system 4 of this second embodiment uses same lower-power tire pressure sensors 33, 34 and same receiving antennas 41, 42 for short distance receiving operation, lowering the collision rate during transmission of data packets.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A tire pressure monitoring system adapted for installation in a vehicle for detecting tire pressures of vehicle wheels of said vehicle through tire pressure sensors respectively installed in the vehicle wheels of said vehicle and capable of wirelessly transmitting detected tire pressure data in the form of a data packet, said tire pressure monitoring system comprising;

a monitoring main unit adapted to be disposed near a driver's seat of said vehicle for enabling a driver of said vehicle to monitor the operation status of each vehicle wheel of said vehicle;

a plurality of receiving antennas adapted to be installed in a bottom side of said vehicle, each said receiving antenna being adapted to receive a wireless communication signal transmitted from at least one said tire pressure sensor nearby; and a plurality of combiners, each of which has two input terminals and an output terminal, said combiners including at least one first combiner and at least one second combiner, the two input terminals of said first combiner being respectively electrically connected to two said receiving antennas and the output terminal of said first combiner being electrically connected to one of said input terminals of said second combiner and the output terminal of said second combiner being electrically connected to said monitoring main unit so that the wireless communication signals received by said receiving antennas are transmitted through said at least one second combiner to said monitoring main unit through a wired transmission path.

2. The tire pressure monitoring system as claimed in claim 1, wherein a distance between one said receiving antenna and one said tire pressure sensor that is nearest in location to aforesaid one receiving antenna is shorter than the distance between any two of said receiving antennas.

3. The tire pressure monitoring system as claimed in claim 2, wherein said vehicle defines a vehicle head portion and a vehicle tail portion; said at least one second combiner is installed in said vehicle head portion; said at least one first combiner is installed in said vehicle tail portion.

4. The tire pressure monitoring system as claimed in claim 3, wherein said combiners comprises two said first combiners installed in said vehicle head and tail portions respectively, and one said second combiner.

5. The tire pressure monitoring system as claimed in claim 3, wherein said combiners comprises one said first combiner installed in said vehicle tail portion, and one said second combiner installed in said vehicle head portion.

6. The tire pressure monitoring system as claimed in claim 5, wherein the two input terminals of said second combiner are respectively connected to said output terminal of said first combiner and one of said receiving antennas.

7. The tire pressure monitoring system as claimed in claim 1, wherein said combiners form a signal combining circuit having at least three input terminals respectively electrically connected to said receiving antennas and an output terminal electrically connected to said monitoring main unit.

* * * * *